(12) United States Patent
Walker et al.

(10) Patent No.: US 8,330,764 B2
(45) Date of Patent: Dec. 11, 2012

(54) PROGRAMMING FRAMEWORK FOR CLOSED SYSTEMS

(75) Inventors: John Mitchell Walker, Duval, WA (US); Paul L. Bleisch, Sammamish, WA (US); Thomas Wayne Miller, Jr., Redmond, WA (US); Matthew Picioccio, Sammamish, WA (US); Shawn Hargreaves, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1282 days.

(21) Appl. No.: 11/738,144

(22) Filed: Apr. 20, 2007

(65) Prior Publication Data

US 2008/0259087 A1 Oct. 23, 2008

(51) Int. Cl.
*G06F 15/16* (2006.01)
(52) U.S. Cl. ........................................................ 345/504
(58) Field of Classification Search .................. 345/504
See application file for complete search history.

(56) References Cited

U.S. PATENT DOCUMENTS

| | | | | |
|---|---|---|---|---|
| 5,680,534 | A | 10/1997 | Yamato et al. | 395/173 |
| 6,115,036 | A | 9/2000 | Yamato et al. | 345/328 |
| 6,646,653 | B2 | 11/2003 | San et al. | 345/649 |
| 7,116,782 | B2 | 10/2006 | Jackson et al. | 380/251 |
| 7,587,724 | B2 * | 9/2009 | Yeap | 719/328 |
| 2002/0086729 | A1 | 7/2002 | Emmerson et al. | 463/41 |
| 2002/0174224 | A1 * | 11/2002 | Scheifler et al. | 709/225 |
| 2003/0069074 | A1 * | 4/2003 | Jackson | 463/43 |
| 2003/0188173 | A1 * | 10/2003 | Zimmer et al. | 713/189 |
| 2003/0203756 | A1 * | 10/2003 | Jackson | 463/42 |
| 2004/0038740 | A1 | 2/2004 | Muir | 463/40 |
| 2004/0216145 | A1 * | 10/2004 | Wong et al. | 719/321 |
| 2006/0100011 | A1 | 5/2006 | Morrow et al. | 463/29 |

OTHER PUBLICATIONS

Scacchi, W., "Understanding the Requirements for Developing Open Source Software Systems", *IEE Proceedings-Software*, Paper No. 29840, w/revisions Dec. 2001, 26 pages, http://kb.cospa-project.org/retrieve/3264/SCacchi.pdf.

Twilleagher, D. et al., "Java™ Technologies for Games", *ACM Computers in Entertainment*, 2004, 2(2), 9 pages.

Open Source & Low Cost Game Engines, http://ludocraft.oulu.fi/elias/dokumentit/open_source_game_engines.pdf, 60 pages.

* cited by examiner

*Primary Examiner* — Edward Martello
(74) *Attorney, Agent, or Firm* — Woodcock Washburn LLP (57) ABSTRACT

Mechanisms allow for execution of unsigned managed code graphic resource call in a closed system when such unsigned content is executing on the system. For example, a managed code graphic resource device is used between an application running unsigned content and a supervisor mode graphic resource device. A managed mode graphics device validates graphic resource calls made by the application. A managed mode graphics device manages resource calls by differentiating between calls that may be made directly to the supervisor mode graphics device, calls that may be pipelined for later action, and calls that may be made to an intermediate device.

18 Claims, 7 Drawing Sheets

PROGRAMMING FRAMEWORK FOR CLOSED SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, Microsoft Corp.

BACKGROUND OF THE INVENTION

Gaming systems are prevalent in today's computing environments. Game consoles are typically closed systems that only allow signed, or verified, games controlled by hardware vendors to execute on such consoles. This type of development may be called supervisor mode development, in part because the ability to access underlying console resources and the eventual execution of the developed code will undergo a strict verification process to become a signed game. Thus, developers of signed games typically are allowed a certain degree of freedom above that which is given to an ordinary user of the console.

This restriction may be done for various reasons, whether to preserve the business model of having a tightly controlled environment for publishers, where piracy of intellectual property is kept to a minimum, or controlling the types of games that can be played on a gaming system, for instance, to allow content that meets parental expectations for children playing such content. Additionally, allowing only signed code to run helps to control and mitigate the potential for cheating on games in an online community, where certain assumptions, such as community scores or digital currency, are essential to be accurate.

However, these tight restrictions present on game consoles prevent the larger creative community as a whole from developing games or game-like applications on closed game consoles without the need to undergo a verification process. There is a need to allow developers, gamers, general hobbyist, and student game developer communities, among others, to write unsigned games for a traditionally closed system. Additionally, there is a burgeoning market of homebrew developers who spend the time and effort in order to hack game consoles in order to allow the running of unsigned code on such consoles. Without undergoing the verification process, the games developed will be unsigned and not permitted to be operated on a closed console.

To meet this need, restrictions need to be placed on what the unsigned content developers may do. Thus, a managed framework may be used to limit unsigned content developers in a manner unlike the relatively high degree of freedom permitted to developers of signed content. A reduction in content allowed may also reduce the performance of unsigned games, including the graphical response.

SUMMARY OF THE INVENTION

Mechanisms are provided that allow for the use of graphical resources in a closed system when unsigned content is executing on the system. In one aspect of the presently disclosed subject matter, a managed mode graphics device that interfaces with a protected, supervisor mode graphics device running in native language format is made accessible to unsigned content. In one exemplary and non-limiting aspect, a managed mode graphics device manages resource calls by differentiating between calls that may be made directly to the supervisor mode graphics device, calls that may be pipelined for later action, and calls that may be made to an intermediate device.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

Exemplary Computer and Network Environments

Figure 1:
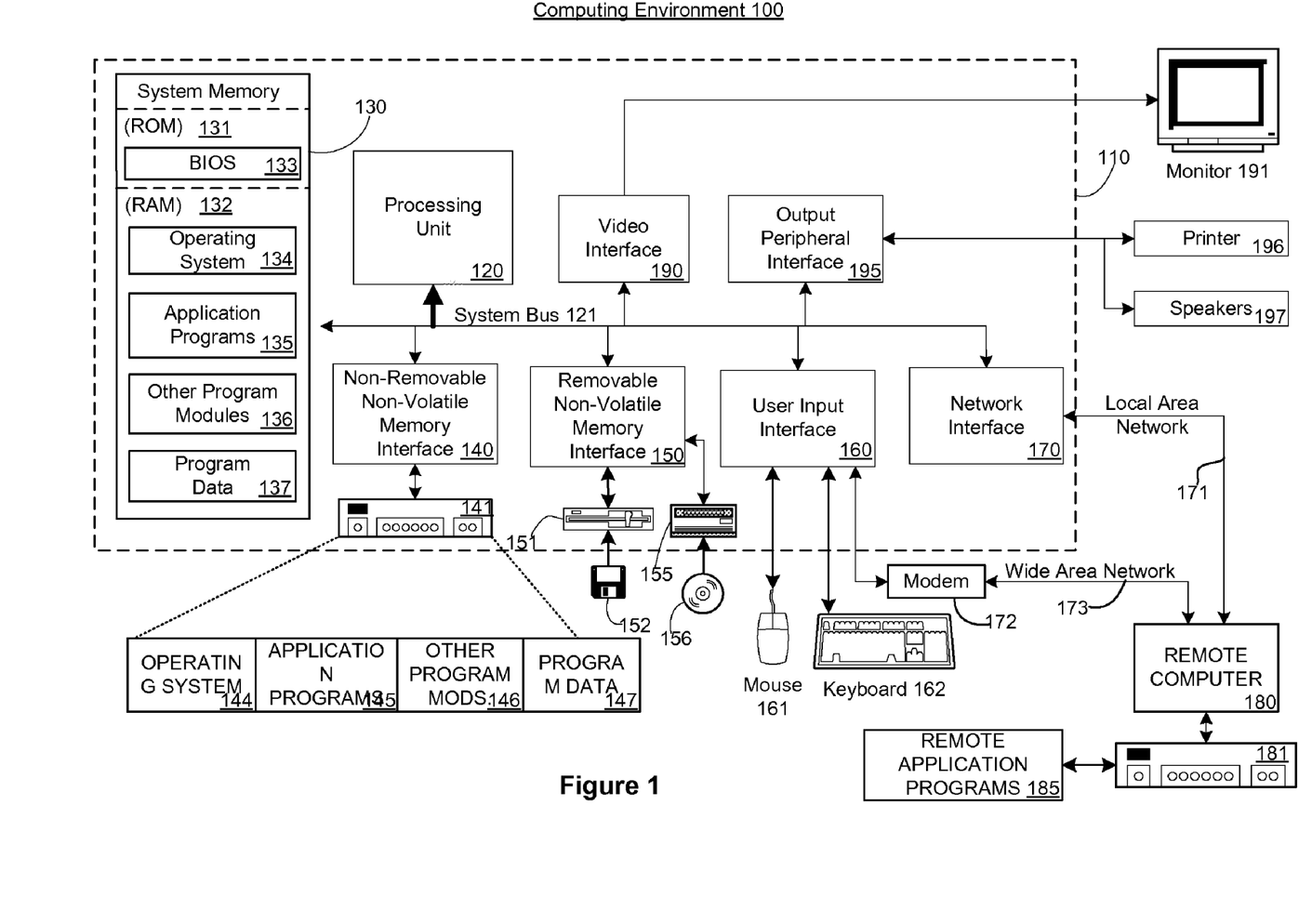
FIG. 1 is a diagram that illustrates a suitable computing system environment in which the present disclosure may be implemented.

FIG. 1 and the following discussion are intended to provide a brief general description of a suitable computing environment in which the present disclosure may be implemented. Although not required, the present disclosure will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments.

Moreover, those skilled in the art will appreciate that the present disclosure may be practiced with other computer system configurations. Other well known computing systems, environments, and/or configurations that may be suitable for use with the present disclosure include, but are not limited to, personal computers (PCs), server computers, hand-held or laptop devices, multi-processor systems, microprocessor-based systems, programmable consumer electronics, network PCs, minicomputers, mainframe computers, gaming platforms and the like. The present disclosure may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the present disclosure may be implemented. The computing system environment 100 is only one example of a suitable computing environment and is not intended to suggest any limitation as to the scope of use or functionality of the present disclosure. For example, graphics devices may be useful in a wide range of platforms. Neither should the computing environment 100 be interpreted as having any dependency or requirement relating to any one or combination of components illustrated in the exemplary operating environment 100.

With reference to FIG. 1, an exemplary system for implementing the present disclosure includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
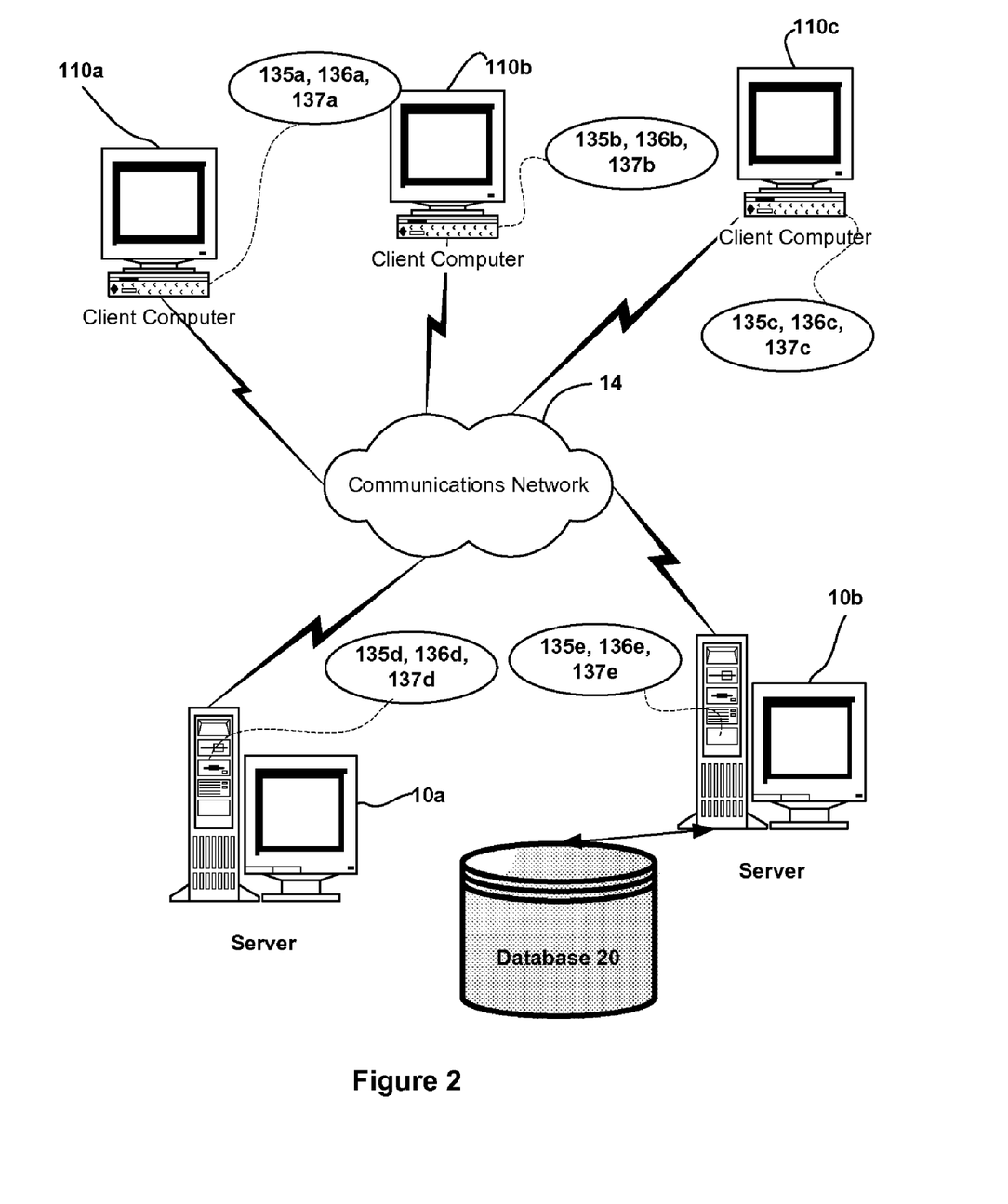
FIG. 2 is a diagram that illustrates an example system where both signed and unsigned games are able to run on a closed system.

As mentioned, a computer, such as described above, can be deployed as part of a computer network. Further, the present disclosure pertains to any computer system having any number of memory or storage units, and any number of applications and processes occurring across any number of storage units or volumes. Thus, the present disclosure may apply to both server computers and client computers deployed in a network environment, having remote or local storage. More and more, graphics applications are becoming deployed in network environments. FIG. 2 thus illustrates an exemplary network environment, with a server in communication with client computers via a network, in which the present disclosure may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, servers 10 can be Web servers with which the clients 110a, 110b, etc. communicate via any of a number of known protocols such as hypertext transfer protocol (HTTP).

The present disclosure may also leverage peer to peer networking techniques. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Each client computer 110 and server computer 10 may also be connected to additional storage elements 20, such as a database. Thus, the present disclosure can be utilized in a computer network environment having client computers for accessing and interacting with a network and server computers 10a, 10b, etc. for interacting with client computers.

Overview

Typically, game consoles such as those discussed above only allow signed games to execute. To ensure that signed games do not expose a closed console in any exploitive way, games are pushed through a process known as certification. Certification requires that games follow a stringent set of rules before games can be signed. These stringent rules are in place to prevent titles (e.g., games or applications) from unknowingly creating an exploit that could allow the closed console to be hacked in a fashion that is detrimental to the manufacturer, as well as content publishers. In particular, preventing piracy of content on closed consoles is important.

Games running on closed consoles will typically require access to a graphics processing unit, or GPU, and other platform graphics resources such as physical memory. In one exemplary and non-limiting aspect, because unsigned games do not go through the typical certification process required of signed games, access to protected platform resources normally provided to developers of signed content, or supervisor mode of development that operates in native code, is desirably limited, thus creating a user mode of development using managed code. With respect to graphical resources, the underlying physical resources are often shared with other processes, including the CPU.

In typical closed gaming consoles, for various reasons, both the CPU and the GPU access the same physical memory. In other words, the CPU and the GPU read and write to common address blocks in the same physical memory. Some of the information written to the physical memory by the CPU may be critical or confidential information. Thus, without a layer of security in place, malignant code introduced via the GPU, rather than the CPU, may access confidential blocks of data, thus exposing protected blocks of physical memory. To reduce the probability, as discussed above, developers of unsigned content are permitted to only use managed code.

Managed code is often used by certified games for code that is repetitive or commonly used, as it allows the developer to work on new aspects of a game rather than having to redo well-known and commonly used aspects. Further, by providing managed code in the user mode, the manner in which the developer may access system resources is limited by the code provided, thus the developer is "managed" or "sandboxed". The downside of providing managed code is, especially in the area of graphics, that an additional layer of communication has been added. Prior to managed code, resource calls were made directly to native or supervisor mode devices. Managed code requires that resource calls be made to a managed mode graphics device, and thereafter, to the supervisor mode graphic device.

This added layer of communication in the area of graphics, typically one of the heaviest resources used in closed console gaming, may create a bottleneck that may degrade the performance of the closed console. If performance is degraded significantly, the use of managed code may not be viable and the goals of managed code may therefore not be met. Although the added layer of communication in the present disclosure is used to secure closed console protected resources, the present disclosure introduces the ability to reduce the limitations and increase performance to an acceptable level.

Graphical Resource Overview

Figure 3:
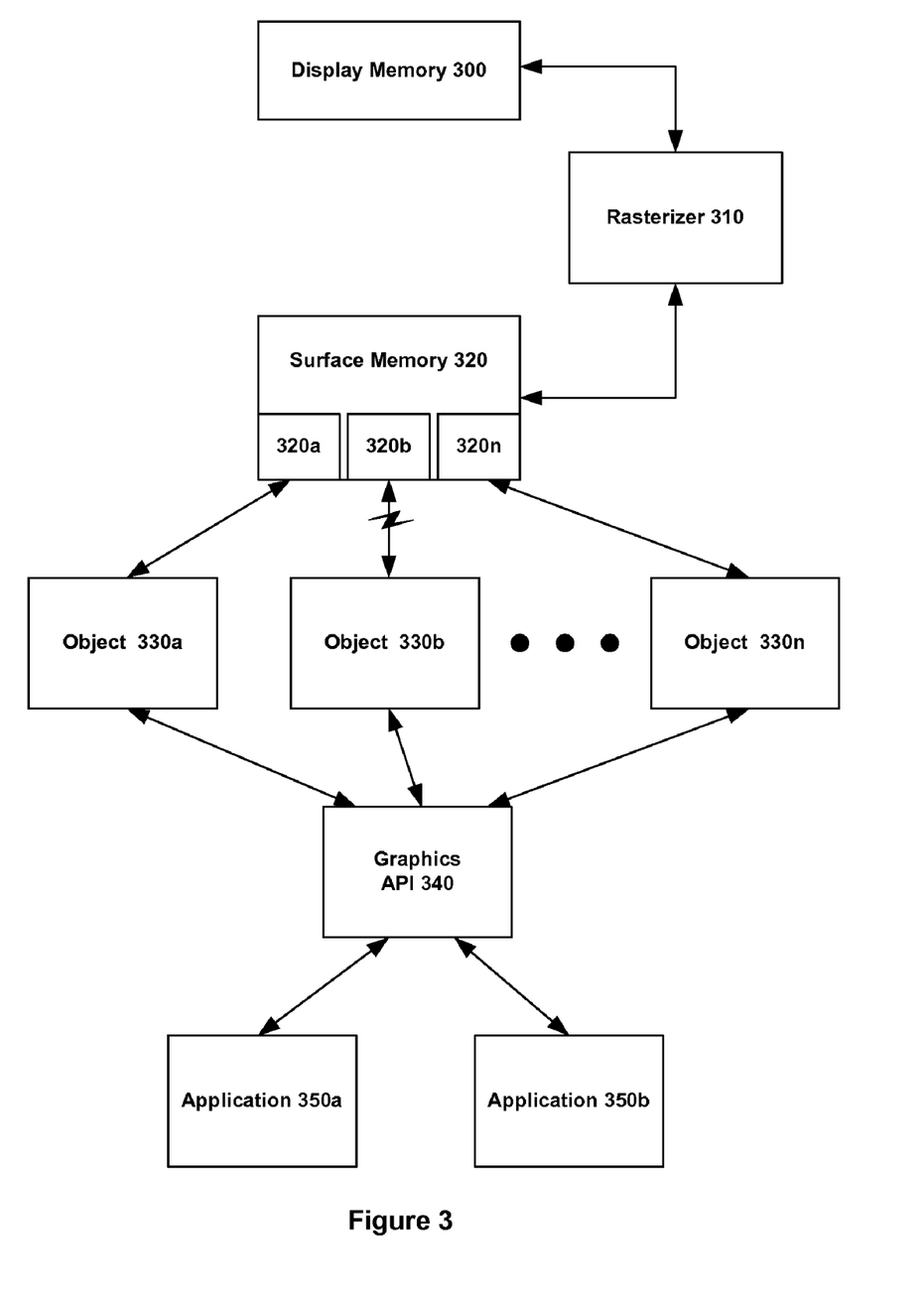
FIG. 3 is a diagram that illustrates an example logical architecture of the graphic resource in closed system.

FIG. 3 illustrates some elementary components of a 3D graphics system operating in supervisor mode using native language. A rasterizer 310 processes graphics data from surface memory 320 in preparation for its transmission to a display device having display memory 300. Any number of objects 330a, 330b to 330n may be created through graphics API 340 when applications 350a and 350b or more are running. Objects 330a, 330b to 330n may be part of the graphics API 340 or may be provided separately for use with the graphics system.

As FIG. 3 illustrates, in supervisor mode, there are no barriers to limit the access of applications 350a and 350b to surface memory 320. In closed gaming consoles, to eliminate the need for expensive data transfer mechanisms, typically the CPU and GPU share the same surface memory. The common access may allow unsigned content containing possibly nefarious code to access potentially confidential and vital information contained on the surface memory.

Figure 4:
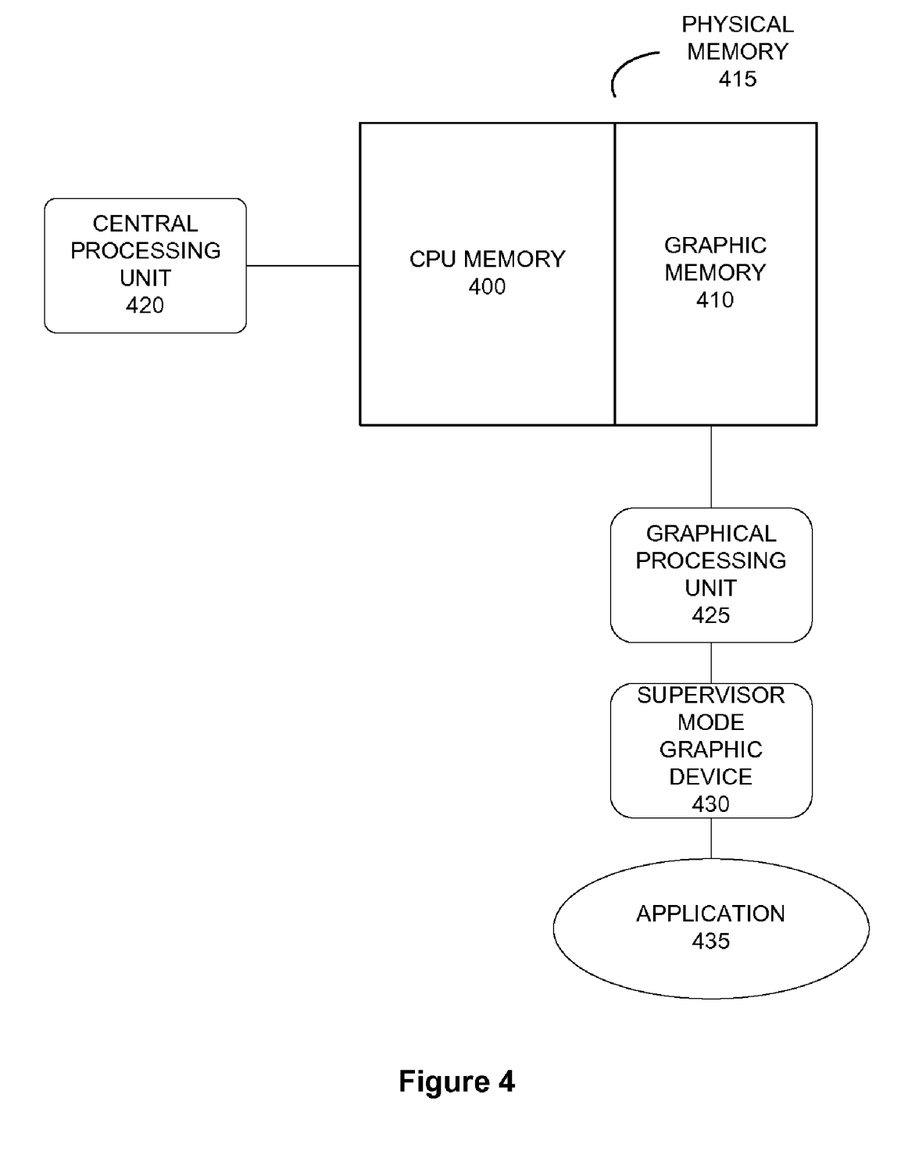
FIG. 4 is a diagram that illustrates an example logical architecture of physical memory usage.

FIG. 4 is a simplified illustration of FIG. 3 showing an example of the overall logical architecture of closed console graphics. As shown, a closed console may have physical memory 415. Physical memory 415 is shown divided into memory used by the CPU 420, CPU memory 400, and memory used by the GPU 425, GPU memory 410. The division of physical memory 415 shown is only to illustrate that portions may be used for CPU 420 and GPU 425 of the closed console. Other devices may access physical memory 415. Additionally, CPU memory 400 and graphic memory 410 may overlap or have the same memory addresses in some instances.

CPU 420 and GPU 425 access their respective portions of physical memory 415. Application 435 generates a graphic resource call to supervisor mode graphic device 430. Device 420 in turn sends the requisite instructions to GPU 425, which in turn accesses graphic memory 410 as appropriate. If malicious code were introduced to make a resource call upon GPU 425 for a block of CPU memory 400, it may be possible to access confidential data and/or cause undesired effects upon the system, such as forcing the closed console to perform certain actions that may not be desired by the closed console manufacturer. To reduce the probability that malignant code is directly introduced, as discussed above, managed code may used.

Figure 5:
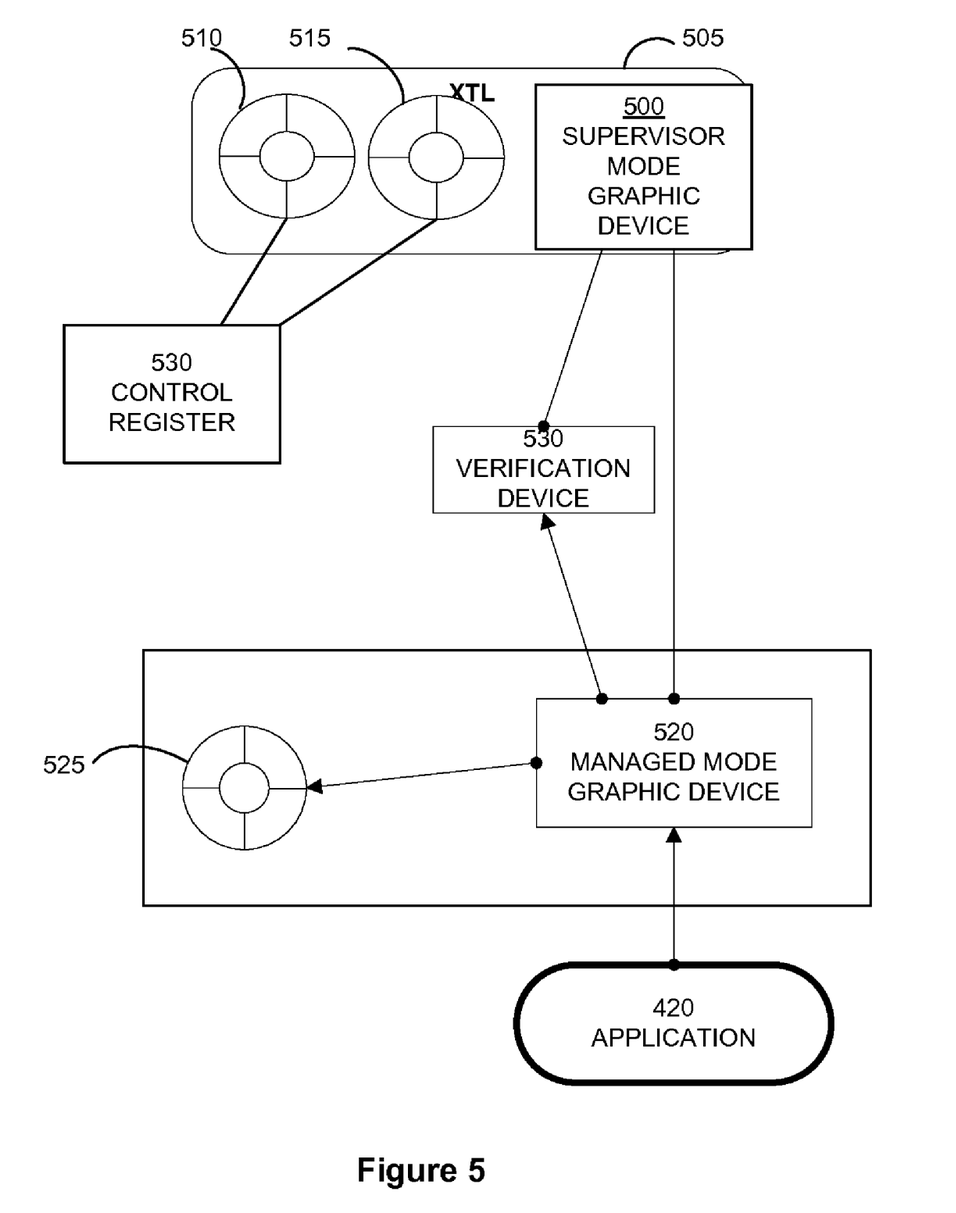
FIG. 5 is a diagram that illustrates an example of the logical architecture of the implementation of a managed mode graphical device in a managed system.

The use of managed code may reduce the performance of the closed console when running unsigned content, including the performance of graphics rendering. To increase closed console performance, a managed mode graphic device is made available to the unsigned content. FIG. 5 is a diagram that illustrates an example of providing a managed graphic device. In FIG. 5, managed mode graphic device 520 provides a virtualized graphics stack to the unsigned content, wherein managed mode graphic device 520 sends some commands directly to supervisor mode graphic device 430, pipelines other graphical commands for later processing, and filters some commands prior to sending to supervisor mode graphic device 430. The graphics stack is partially hoisted into managed code, whereas the remaining portions which are not hoisted into managed code are protected by a validation layer, as described below.

In FIG. 5, closed console graphic resource 505 has supervisor mode graphic device 500 which operates in native code. Supervisor mode graphic device 500 submits graphic resource calls to GPU 425, as shown in FIG. 4. As discussed above, the CPU and GPU of the closed console may share portions of physical memory, illustrated as primary ring buffer 515 and secondary ring buffer 510. It should be noted that ring buffers are exemplary and that other methods of memory storage may be used. Further, a GPU may also have a number of control registers, illustrated as control register 530, which configure various features of the GPU. In one exemplary and non-limiting example, register 530 may control access to ring buffers 510 and 515, video mode controls and GPU status information. Register 530 may be mapped into the CPU address space at a well-known address. Thus, if unrestricted access is allowed to either register 530 or device 500, malignant code may control low-level functions of the closed console and expose the protected resources.

Thus, managed mode graphic device 520 is presented as a gatekeeper for unsigned content. Managed mode graphic device 520 receives a graphic resource call from application 420. If the graphic resource call made upon device 520 is in a pre-approved list of resource calls, device 520 may in turn send the resource call directed to supervisor mode graphic device 500 to act directly upon the protected resources of the closed console. If the resource call is not one that can be made directly, additional layers of protection are provided.

One layer of protection may be to shield the memory addresses from user mode resource calls, i.e. calls made by managed code, unsigned content. Shown in FIG. 5 is high level control buffer 525. Because access to ring buffers 510 and 515 may cause issues, it may be preferable to not make ring buffers 510 and 515 accessible to user mode unsigned content, i.e. managed code. Rather, memory addresses available in ring buffers 510 and 515 may be hidden from user mode unsigned content by using high level control buffer 525. Resource calls sent to buffer 525 may be pipelined resource calls that do not need to be processed immediately. Buffer 525, at a determined point, will release resource calls stored in buffer 525 to be verified, as described below.

Another layer of protection may be to validate a resource call. Shown in FIG. 5 is verification device 530. Verification device 530 receives either pipelined resource calls from buffer 525 or resource calls sent by managed mode graphic device 520. Managed mode graphic device 520 only has access to resources through the use of handles. In this context, handles may be understood to be tokens, typically indices into a table of available resources, which enable a program to access a resource, such as a library function or some hardware resource. Therefore, instead of releasing and making available known resource addresses, fictitious addresses are provided. Verification device 530 looks up the handle-to-resource table to determine the actual resource location when verification device 530 receives a resource call using a handle.

Figure 6:
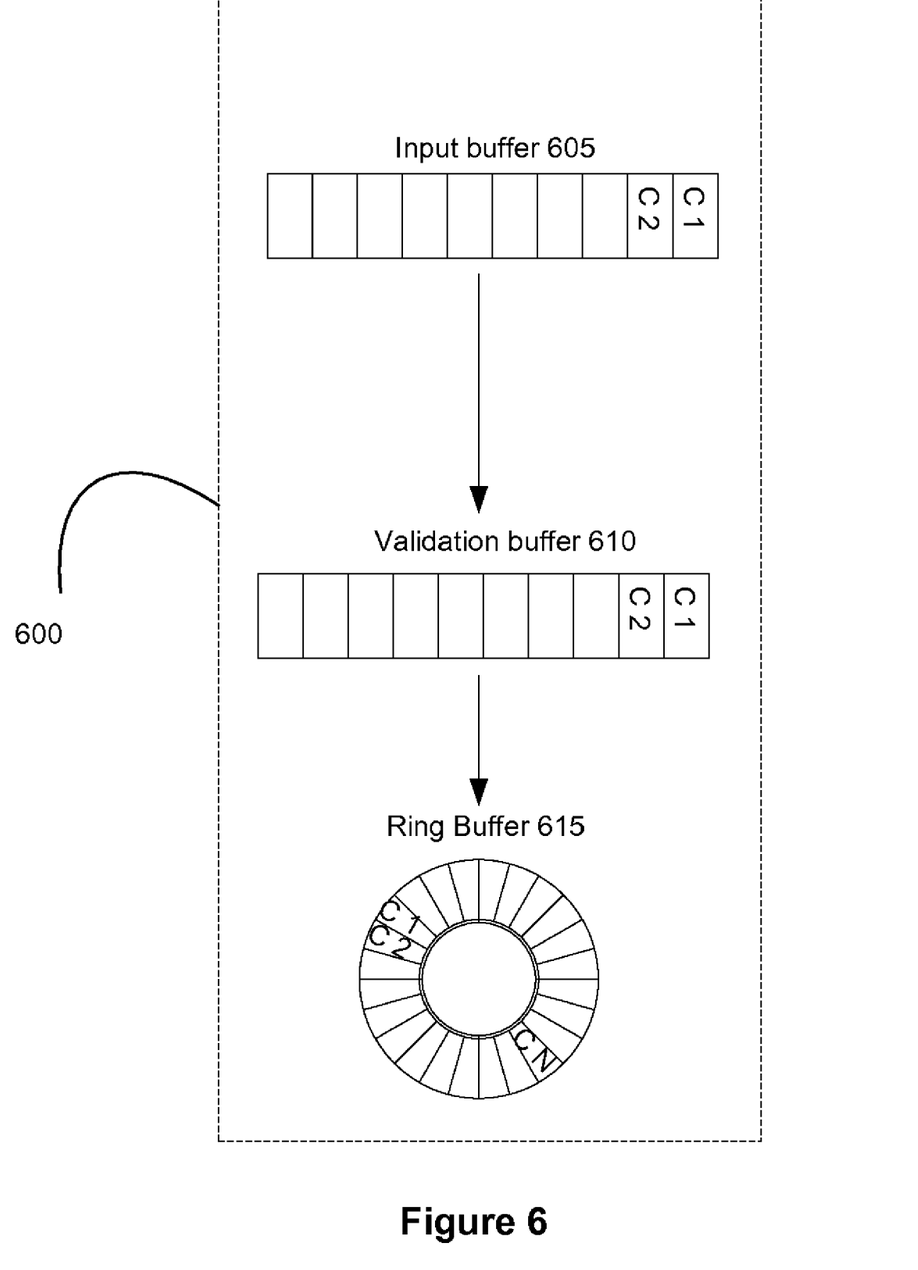
FIG. 6 illustrates in block diagram form an exemplary way of managing resource calls.

Besides providing an intermediary point between the handle identification and the resource identification, verification device 530 may also be used to verify the validity of the resource call. One way may be to determine that any resource call made using an unknown handle is invalid. Another way may be to conclude that any resource call using a handle in a manner not previously approved is invalid. The prior manners of validating resource calls are exemplary and non-limiting. FIG. 6 is an exemplary and non-limiting illustration of the logical architecture of verification device 530.

Verification device 600 may have an input buffer 605 that receives the managed mode resource call. Those of skill in the art will readily appreciate the different types of buffers that could be used herein, such as vertex buffers, index buffers, vertex and pixel shaders, and so on. Once the resource call is inputted into input buffer 605, it can be copied from input buffer 605 into validation buffer 610. In validation buffer 610, information (code, data, or any other equivalent thereof) can be validated to make sure it is the type of information that is supposed be allowed access to supervisor mode graphic device 500 of FIG. 5.

The verification process can be defined by the console manufacturer or other third party, and it can be continuously updated and monitored by such parties. As discussed above, handles may be validated in the validation buffer 610, where "handles" are understood to be tokens which enable a program to access a resource, such as a library function or some hardware resource, as discussed above. If this information is valid, it can then be passed down to ring buffer 615 for execution against native console resources. It should be understood that other buffer architectures can be used given the type of information that is input 600. Ring buffer 615 may be used when commands are stored in validation buffer 610. If, on the other hand, parameters to commands are provided, ring buffer 615 may not be needed.

Resource Call Process Flow

Figure 7:
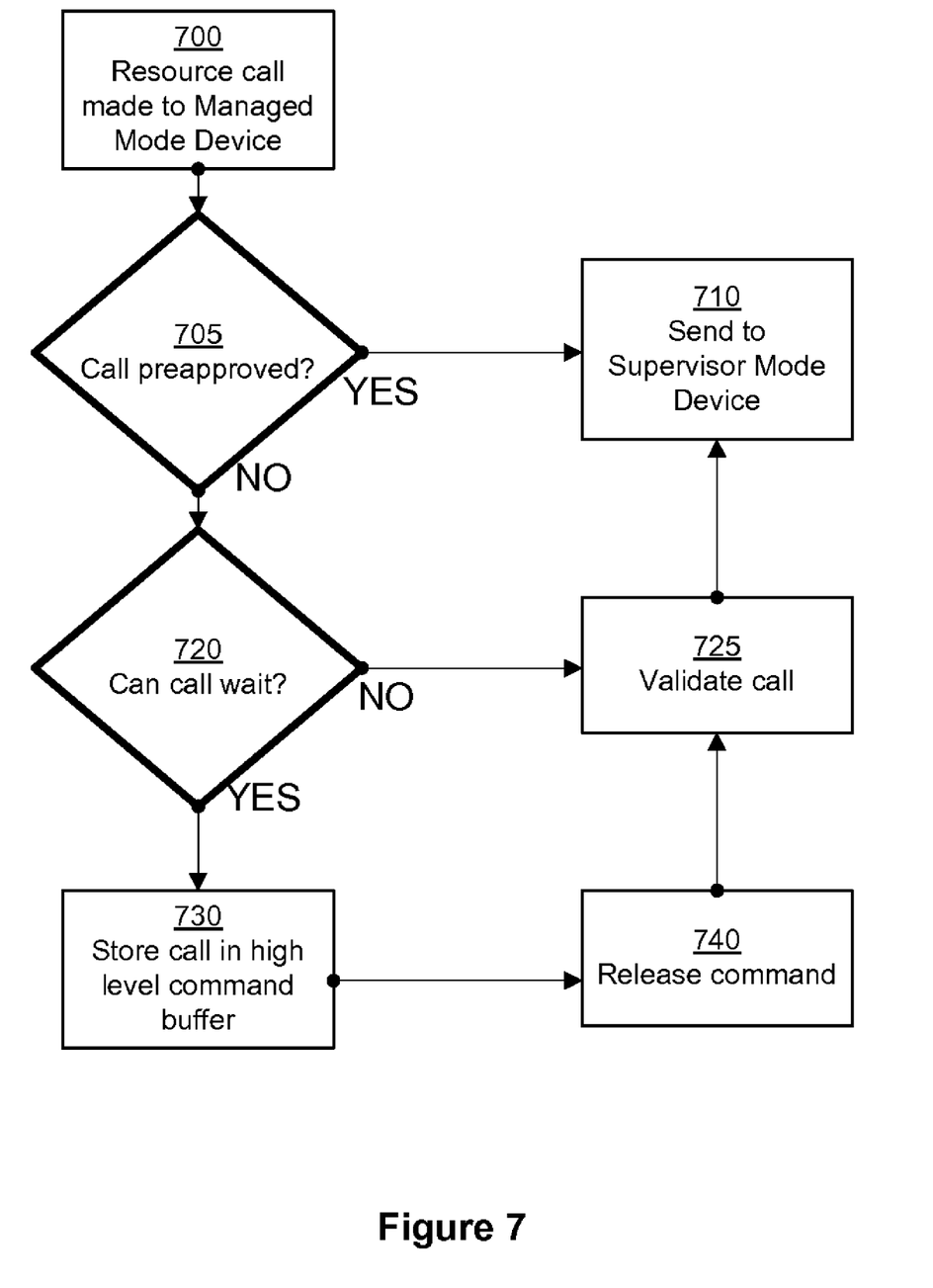
FIG. 7 is an exemplary process flow diagram illustrating the processing of resource calls.

As discussed above, in one exemplary and non-limiting example, managed mode graphic device 520 of FIG. 5 may take a resource call made by application 420 and either send it directly to supervisor mode graphic device 500, pipeline the call for later processing by sending the call to command buffer 525, or, send the call to be verified and processed by verification device 530. FIG. 7 is an exemplary process flow diagram illustrating the processing of resource calls by managed mode graphic device 520.

Once a resource call is made at step 700 to managed mode resource device, the device determines at step 705 if the call is pre-approved. One exemplary and non-limiting way this can be done is to have the device determine if the call is in a list. It should be understood that there may be several ways of determining if a call is approved. If the call is approved, the call is sent directly to the supervisor mode device at step 710. If the call is not approved at step 705, managed mode graphic device 520 may then determine if the call is one that can be pipelined and await processing. Again, as with the determining if a call is approved, there may be several ways of determining if a call can be pipelined.

If a call cannot wait at step 720, the call is validated at step 725 and sent to supervisor mode device at step 710. If the call can wait, the call may be stored in a high level command buffer for later processing at step 730. At some point in the future, at step 740, the resource call will be released, validated at 725 and sent to the supervisor mode device at step 710. The determination of when to release commands may vary according to performance characteristics. For example, it may be more beneficial to pipeline graphic resource calls that are not directly related to the current game play while sending resource calls to be validated that will have a direct, adverse impact on game play.

As mentioned, the various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present subject matter may be implemented in or across a plurality of processing chips or devices, and storage may similarly be affected across a plurality of devices. Therefore, the presently discussed aspects should not be limited to any single embodiment, but rather should be construed in breadth and scope in accordance with the appended claims.

What is claimed:

1. An apparatus for executing one or more of a set of graphical resource calls made to a closed system, comprising:
   a supervisor mode graphic device for executing the one or more of the set of graphical resource calls, the set of graphical resource calls comprising one or more signed graphical resource calls from one or more signed applications and one or more unsigned graphical resource calls from one or more unsigned applications, the supervisor mode graphic device executing all of the signed graphical resource calls, all preapproved unsigned graphical resource calls, and only validated non-preapproved unsigned graphical resource calls; and
   a managed mode graphic device in communication with the supervisor mode graphic device, wherein the managed mode graphic device determines, for each unsigned graphical resource call, whether the unsigned graphical resource call is preapproved and, if the unsigned graphical resource call is preapproved, submits the unsigned graphical resource call to the supervisor mode graphic device without validation, and, if the unsigned graphical resource call is not preapproved, sends the unsigned graphical resource call for validation prior to submission to the supervisor mode graphic device.

2. The apparatus of claim 1, further comprising a command buffer, wherein the command buffer is configured to store at least one resource call communicated from the managed mode graphic device.

3. The apparatus of claim 1, further comprising a verification device in communication with the supervisor mode graphic device for validating resource calls.

4. The apparatus of claim 3, wherein the verification device comprises:
   an input buffer for receiving each non-preapproved unsigned graphical resource call from the managed mode graphic device; and a validation buffer for checking each non-preapproved unsigned graphical resource call against approved resource calls.

5. The apparatus of claim 3, wherein each non-preapproved unsigned graphical resource call is validated by the verification device prior to receipt of the resource call by the supervisor mode graphic device.

6. The apparatus of claim 5, wherein each non-preapproved unsigned graphical resource call is communicated to the supervisor mode graphic device if valid.

7. A method for executing one or more of a set of graphical resource calls made to a closed system, comprising:
  executing the one or more of the set of graphical resource calls at a supervisor mode graphic device, the set of graphical resource calls comprising one or more signed graphical resource calls from one or more signed applications and one or more unsigned graphical resource calls from one or more unsigned applications, the supervisor mode graphic device executing all of the signed graphical resource calls, all preapproved unsigned graphical resource calls, and only validated non-preapproved unsigned graphical resource calls;
  for each of the unsigned graphical resource calls:
    determining whether the unsigned graphical resource call is preapproved;
    if the unsigned graphical resource call is preapproved, submitting the unsigned graphical resource call without validation to a supervisor mode graphic device for execution; and
    if the unsigned graphical resource call is not preapproved, sending the unsigned graphical resource call for validation prior to submission to the supervisor mode graphic device.

8. The method of claim 7, comprising sending each non-preapproved unsigned graphical resource call to a verification device for validation.

9. The method of claim 7, further comprising communicating by the verification device each non-preapproved unsigned graphical resource call to the supervisor mode graphic device if valid.

10. The method of claim 7, further comprising storing at least one resource call communicated from the managed mode graphic device.

11. The method of claim 7, further comprising validating by the verification device each non-preapproved unsigned graphical resource call prior to receipt of the resource call by the supervisor mode graphic device.

12. The method of claim 11, further comprising:
  receiving each non-preapproved unsigned graphical resource call from the managed mode graphic device in an input buffer of the verification device; and
  checking by a validation buffer of the verification device each non-preapproved unsigned graphical resource call against approved resource calls.

13. A computer readable storage medium that is not a signal and that has stored thereon computer executable instructions for executing one or more of a set of graphical resource calls made to a closed system, comprising:
  executing the one or more of the set of graphical resource calls at a supervisor mode graphic device, the set of graphical resource calls comprising one or more signed graphical resource calls from one or more signed applications and one or more unsigned graphical resource calls from one or more unsigned applications, the supervisor mode graphic device executing all of the signed graphical resource calls, all preapproved unsigned graphical resource calls, and only validated non-preapproved unsigned graphical resource calls;
  for each of the unsigned graphical resource calls:
    determining whether the unsigned graphical resource call is preapproved;
    if the unsigned graphical resource call is preapproved, submitting the unsigned graphical resource call without validation to a supervisor mode graphic device for execution; and
    if the unsigned graphical resource call is not preapproved, sending the unsigned graphical resource call for validation prior to submission to the supervisor mode graphic device.

14. The computer readable storage medium of claim 13, comprising sending each non-preapproved unsigned graphical resource call to a verification device for validation.

15. The computer readable storage medium of claim 13, further comprising communicating by the verification device each non-preapproved unsigned graphical resource call to the supervisor mode graphic device if valid.

16. The computer readable storage medium of claim 13, further comprising storing at least one resource call communicated from the managed mode graphic device.

17. The computer readable storage medium of claim 13, further comprising validating by the verification device each non-preapproved unsigned graphical resource call prior to receipt of the resource call by the supervisor mode graphic device.

18. The computer readable storage medium of claim 17, further comprising:
  receiving each non-preapproved unsigned graphical resource call from the managed mode graphic device in an input buffer of the verification device; and
  checking by a validation buffer of the verification device each non-preapproved unsigned graphical resource call against approved resource calls.

* * * * *